United States Patent

Turner et al.

[11] 4,085,686
[45] Apr. 25, 1978

[54] COLLAPSIBLE FISHING STOOL

[76] Inventors: Raymond R. Turner, 10852 Woodward La., Garden Grove, Calif. 92640; Elton W. Turner, 316 Lenore Trail, Chesapeake, Va. 23320; Jerry Turner, 711 Ballard Dr., Melbourne, Fla. 32935; Robert J. Winkler, 2101 E. 4th St., Santa Ana, Calif. 92704

[21] Appl. No.: 818,307

[22] Filed: Jul. 25, 1977

[51] Int. Cl.² ............................................. A47C 7/62
[52] U.S. Cl. ..................................... 108/25; 248/156; 297/217
[58] Field of Search ............ 108/25; 248/155.4, 155.6, 248/156; 297/188, 217

[56] References Cited
U.S. PATENT DOCUMENTS

| | | | |
|---|---|---|---|
| 2,258,940 | 10/1941 | Stanton | 248/156 X |
| 2,607,398 | 8/1952 | Andrews | 297/217 X |
| 2,625,985 | 1/1953 | Morgan et al. | 248/156 X |
| 2,877,828 | 3/1959 | Barnette, Jr. | 248/156 |
| 3,077,327 | 2/1963 | Batie et al. | 297/217 X |
| 3,622,201 | 11/1971 | Radig | 297/217 |
| 3,623,766 | 11/1971 | Funk | 297/217 X |
| 3,747,881 | 7/1973 | Akamu | 297/188 X |

Primary Examiner—Roy D. Frazier
Assistant Examiner—Peter A. Aschenbrenner
Attorney, Agent, or Firm—William C. Babcock

[57] ABSTRACT

A collapsible stool structure adapted for use in fishing and other outdoor activities comprises a support shaft which is received in a base plate on assembly. Disposed on the other end of the support shaft and pivotally attached thereto is a seat structure including two angle members radially extending from the pivot to engage one end of a triangle member which, by way of the bell crank bracket pivotally engages the support shaft. The two angle members furthermore attach to a tackle box or similar equipment storage device and by virtue of their attachment to the seat and the tackle box provide a separating gap equal to both the triangulating member and the base shaft. In this manner the seat structure may be pivoted into a position where the angle members are disposed on either side of the support shaft or may be rotated from that position to engage a transverse pin in corresponding detents formed in the underside thereof. The base plate may further include a tubular mount on the underside thereof for receiving a tube segment cut on a diagonal for insertion into the ground.

6 Claims, 6 Drawing Figures

U.S. Patent    April 25, 1978    4,085,686
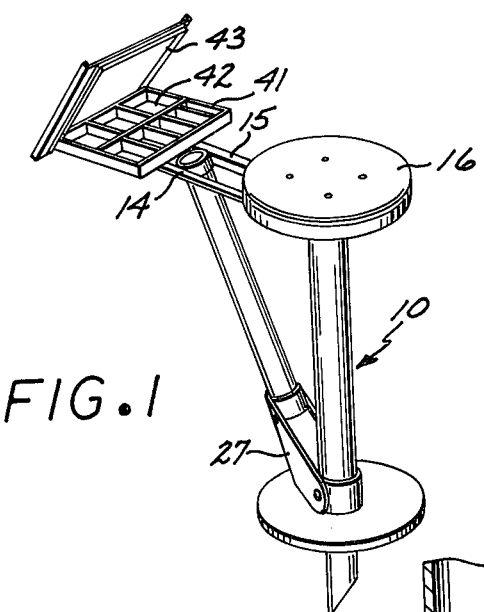
FIG. 1
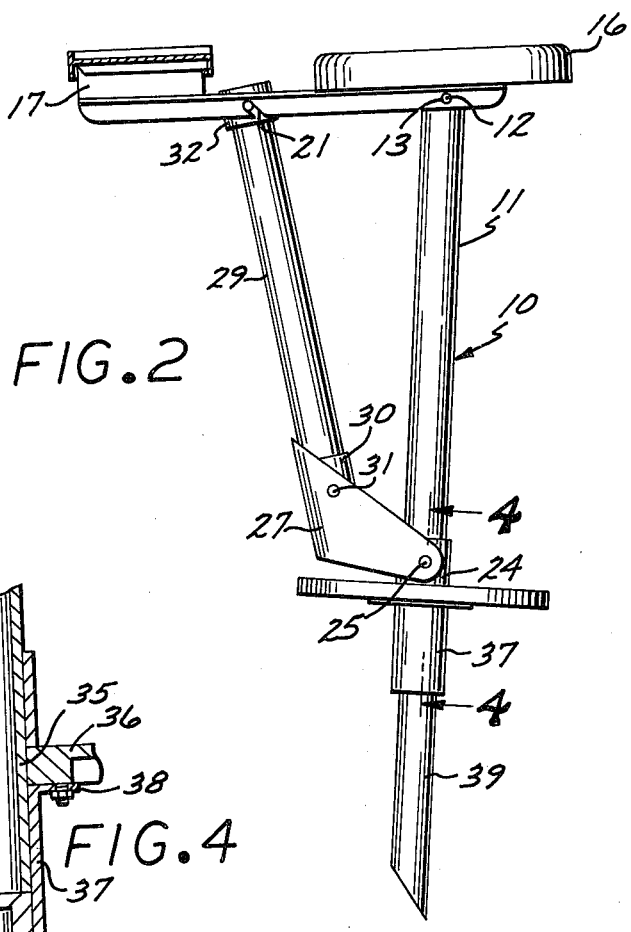
FIG. 2
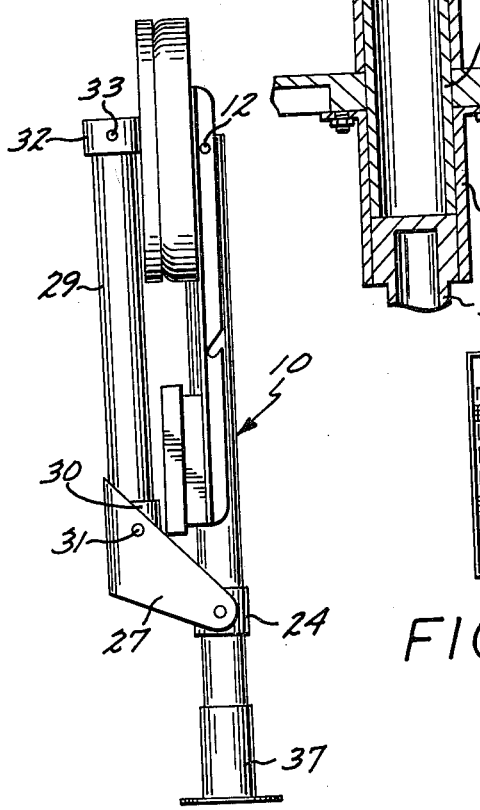
FIG. 3
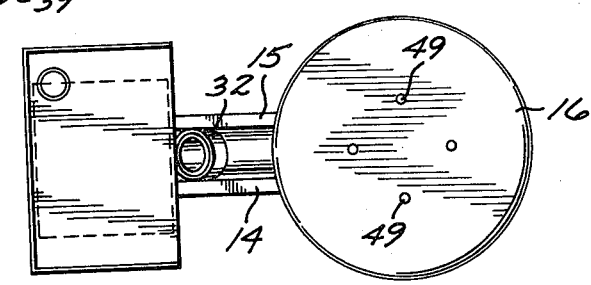
FIG. 4
FIG. 5
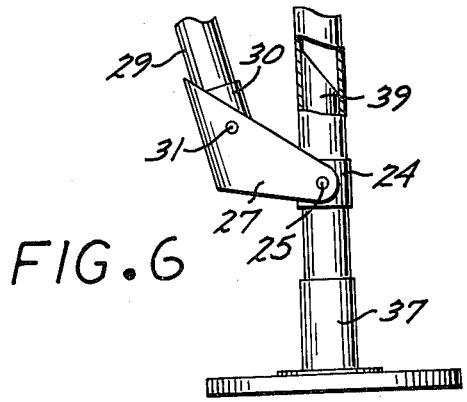
FIG. 6

COLLAPSIBLE FISHING STOOL

BACKGROUND OF THE INVENTION

1. Field of the Invention

The present invention relates to seating devices and more particularly to a collapsible stool for use in outdoor activities.

2. Description of the Prior Art

Collapsible seats have had wide acceptance in the past and various forms thereof have been devised both for easy mobility and for convenience in use. In each instance it has been the seat structure itself that has had the most consideration and the various accessories appended thereto were normally treated on an add-on basis.

In activities such as fishing, there are two functions which must be provided, one of which being the actual seating function and the second one being the retention of the fishing pole. It is often convenient and comfortable to provide both the seating structure and the structure for retaining a fishing pole in fishing applications, the degree of effort in each instance being protracted over extensive periods of time with the attendant discomfort being greatly amplified by the duration.

In addition to the foregoing, some outdoor activities like fishing entail various equipment demands, these once more being of such a nature as to require extensive storage and repetitive access.

As a further feature, these prior art collapsible chairs are normally tailored to a particular use and variation of uses therefor becomes quite complex particularly in view of the specialized structure provided in each instance. For example, it is often necessary to dispose a chair on a deck of a boat or on a hard surface like that of a pier, that the same chair structure heretofor being inadequate for use in soft ground. Thus the user would either avail himself to a complement of various collapsible chairs, each one particularly tailored and depending on the intended use will transport the particular chair to the site. On arriving at the site, any changes in the final seating surface selected are often not compatible with the chair transported. Thus, the accommodation of the various uses in a collapsible chair is a feature of some importance, the advantages of a single structure being adapted for various uses being well recognized.

SUMMARY OF THE INVENTION

Accordingly, it is the general purpose and object of the present invention to provide a collapsible fishing stool having provisions for alternative uses on hard surfaces as well as soft ground.

Other objects of the invention are to provide a collapsible fishing stool which can be utilized both as a portable device and permanently affixed to the deck of a boat.

Yet further objects of the invention are to provide a collapsible fishing stool which includes provisions in the structure thereof for containing various fishing articles.

Yet additional objects of the invention are to provide a collapsible fishing stool which is convenient in use, simple in manufacture, and requires few parts.

Briefly these and other objects are accomplished within the present invention by providing a tubular support shaft including a circular collar formed thereabout proximate the lower end thereof, said circular collar including two diametrically opposed pivot pins for securing a U-shaped bell crank bracket in rotation. The U-shaped bell crank bracket is furthermore secured to the lower end of yet another tubular member of triangulating member, the triangulating member being received within the crook of the "U" and secured thereat. The free end of the pivoted triangulating member furthermore includes yet another collar, similarly provided with diametrically opposed pins, said collar being disposed for engagement with a pivoted seat frame mounted on the free end of the support shaft. The seat frame itself comprises two parallel angle members attached to the underside of a circular seat at one end and secured at the other end to the underside of a tackle box or similar container. Formed in each one of the angle members is a locking slot into which the pins extending from the second collar on the free end of the triangulating element are received. By virtue of this arrangement, the seat assembly is normally stored in a collapsed state along the support shafts. On deployment, the frame is rotated about a pivot on the free end of the support shaft and the triangulating element is placed in position. Once so connected, a triangular seat structure is formed which may be either attached to the flanged support segment or to a circular base.

BRIEF DESCRIPTION OF THE DRAWING

FIG. 1 is a perspective illustration of a collapsible fishing stool constructed according to the present invention;

FIG. 2 is a side view of the stool shown in FIG. 1 being conformed for insertion into soft ground;

FIG. 3 is a side view of the stool shown in FIG. 2 collapsed for transportation;

FIG. 4 is a sectional view taken along the line 4—4 of FIG. 2;

FIG. 5 is a top view of the stool shown in FIG. 2, illustrating the disposition of the various elements thereof in use; and FIG. 6 is a detailed view in partial section illustrating yet another base configuration achievable with the parts disclosed herein.

DESCRIPTION OF THE SPECIFIC EMBODIMENTS

As shown in FIGS. 1, 2 and 3, the collapsible stool, generally designated by the numeral 10, comprises a tubular support shaft 11 provided with two diametrically opposed pivot pins 12 on the upper end thereof. Pins 12 engage correspondingly opposed bores 13 formed in the vertical surfaces of two parallel angle extrusions 14 and 15 respectively. Extrusions 14 and 15 are, in turn, attached to the underside of a circular stool surface 16 on one end and a tackle box or container 17 on the other end. It is to be noted that the disposition of the stool surface 16 relative the pivot 12 is such that upon rotation of the parallel extrusions 14 and 15 thereabout, the stool surface is aligned substantially axial with the center of the support shaft 11. The vertical surfaces of extrusions 14 and 15 furthermore include proximately central thereto, first and second retaining slots 21 and 22, slots 21 and 22 being aligned along an outwardly directed axis away from the pivot 12. Formed proximate the lower end of the support shaft 11 and affixed in surrounding relationship thereabout is a collar 24 again provided with two diametrically opposed pins 25 extending towards the exterior thereof. Pins 12 and 25 are arranged to extend substantially on parallel axis, pins 25 providing yet another pivot point for a U-shaped sheet metal bell crank frame 27. More specifically, bell crank frame 27 comprises an elongate strip or sheet of metal bent in a manner of a "U", the free ends thereof being affixed for pivotal rotation around said pins 25. Received within the interior of the U and aligned in conforming alignment therein is the lower ends of a triangulating member 29 once more conformed in the manner of a tube or a cylinder. Member 29, furthermore, includes at the lower end thereof a securing collar 30, the common structure of collar 30, member 29 and frame 27 being affixed relative each other by fastening devices shown herein as an exemplary fastening device 31. Formed on the free end of member 29, and once more affixed thereto, is yet another collar 32, again provided with two diametrically opposed pins 33. It is these pins 33 that are receivable within the interior of the engaging slots 21 to provide the necessary triangulating function and thus support or fix the seat surface 16 relative the support shaft 11.

As shown in FIGS. 1, 2 and 4 the support shaft 11 extends below the collar 24 to provide a projecting end 35 which, in one configuration, may be insertable into the center opening of an annular base plate 36. On the other side, base plate 36 may be opposed by a flanged tubular segment 37 having a flange 38 attached to the base plate 36. Segment 37 is conformed to provide a receiving opening on the interior thereof for the exposed end of the support shaft 11. Segment 37, furthermore, is conformed to receive an enlarged end of a spike structure 39 in the end opening thereof. It is this spike structure 39 that is insertable into the soft ground, the insertion being made to the depth where the base plate 36 distributes the weight.

In an alternative embodiment shown in FIG. 6 the base plate and the tubular segment 37 may be rotated to a position where the segment is pointing upwardly, thus providing a rigid support for uses such as those entailed in mounting the seat structure to a boat deck or for disposing the seat on a pier or similar hard structure. Again, by reference to FIG. 6 the interior cavity within shaft 11 is conformed to receive projection 39, this manner of conforming fit providing the necessary alternative states accommodating the various surface conditions set out hereinabove.

By further reference to FIGS. 1, 2, and 5 container 17 may include a rectangular box 41 divided by a plurality of partitions into tackle receiving cavities 42 and covered by a pivotal cover 43 forming a tray 44 on the upper surface thereof. Tray 44 may further include various recesses 45 for storing drinks or similar articles while the free end of the triangulating member 29 provides the opening for inserting a fishing rod or a similar device.

The foregoing configuration may be conveniently stored by way of the arrangement shown in FIG. 3. More specifically, as shown in FIG. 3, the base plate 36 is conformed to the dimensions of the seat surface 16, both the base plate 36 and the seat surface 16 including a plurality of coincident fastener holes 49, these same fastener holes 49 being provided for attaching the flange 38 to the base plate. It is furthermore these same fastener holes that may be utilized to secure the base plate to the seat surface thus providing a convenient storage arrangement during transportation.

Some of the many advantages of the present invention should now be readily apparent. It is to be understood that the foregoing structure may be achieved by way of various tubular elements and tube segments made of a material like PVC are quite suitable for this purpose. In this configuration, parts conveniently manufactured and connected may be utilized, there being very few special purpose parts requiring manufacture. The resulting structure therefore is conveniently achieved, providing both the necessary adaptability desired and the convenience in assembly.

Obviously many modifications and variations to the above disclosure can be made without departing from the spirit of the invention. It is therefore intended that the scope of the invention be determined solely dependent on the claims hereto.

What is claimed is:

1. A collapsible stool assembly adapted for alternate arrangements comprising:
    a first tubular support member;
    a first circular collar attached around said first support member proximate the lower end thereof said collar including radially extending pivot pins formed on the exterior thereof;
    a seat assembly comprising a first and second elongate brace segment, a circular seat attached to the one ends of said first and second brace segments, storage means attached to the other ends of said brace segments, said first and second brace segments being pivotally attached proximate said one ends thereof to the upper end of said first support member the pivotal axis of said brace segments being substantially parallel to the axis of said pivot pins;
    a second tubular support member pivotally attached to said pivot pins at the lower end thereof; and
    engagement means formed in said brace segments for engaging the upper end of said second support member when said brace segments are pivoted to an alignment substantially orthogonal relative said first support member.

2. Apparatus according to claim 1 further comprising:
    a flanged tube segment including an annular cavity adapted to receive the lower end of said first support member; and
    a pointed end insert alternatively receivable in the common interior of said first support member and said tube segment or in said tube segment to axially extend below said first support member.

3. Apparatus according to claim 2 wherein:
    said first and second support members each comprise plastic tubing.

4. Apparatus according to claim 3 wherein:
    said storage means includes a hinged cover surface attached to form a closure on a container assembly.

5. Apparatus according to claim 4 further comprising:
    an annular base plate alternatively received between said first circular collar and said tube segment or attached to said tube segment distal of said circular collar.

6. Apparatus according to claim 5 wherein:
    said brace segments each comprise angle extrusions attached in parallel to said seat surface and said container assembly, the separation between said extrusions being greater than the thickness of said first and second support members.

* * * * *